United States Patent
Yousef et al.

(10) Patent No.: US 7,970,070 B2
(45) Date of Patent: Jun. 28, 2011

(54) ADAPTIVE FREQUENCY DOMAIN EQUALIZATION IN OFDM BASED COMMUNICATION SYSTEM

(75) Inventors: Nabil Yousef, Foothill Ranch, CA (US); Jun Ma, Xian (CN); Yongru Gu, Lake Forest, CA (US)

(73) Assignee: Newport Media, Inc., Lake Forest, CA (US)

( * ) Notice: Subject to any disclaimer, the term of this patent is extended or adjusted under 35 U.S.C. 154(b) by 594 days.

(21) Appl. No.: 12/120,505

(22) Filed: May 14, 2008

(65) Prior Publication Data
US 2009/0285314 A1 Nov. 19, 2009

(51) Int. Cl.
*H04K 1/10* (2006.01)
(52) U.S. Cl. ........................................................ 375/260
(58) Field of Classification Search .................. 370/203, 370/208, 503; 375/222, 260, 340, 347
See application file for complete search history.

(56) References Cited

U.S. PATENT DOCUMENTS

| | | | | |
|---|---|---|---|---|
| 6,320,901 | B1* | 11/2001 | Arad et al. | 375/222 |
| 2006/0109938 | A1* | 5/2006 | Challa et al. | 375/347 |
| 2006/0203710 | A1* | 9/2006 | Mukkavilli et al. | 370/208 |
| 2009/0135923 | A1* | 5/2009 | Arambepola et al. | 375/260 |
| 2010/0002788 | A1* | 1/2010 | Wu et al. | 375/260 |
| 2010/0166118 | A1* | 7/2010 | Mantravadi et al. | 375/340 |

* cited by examiner

*Primary Examiner* — David C. Payne
*Assistant Examiner* — Leon-Viet Q Nguyen
(74) *Attorney, Agent, or Firm* — Rahman LLC

(57) ABSTRACT

An apparatus, system, and method of performing adaptive frequency domain equalization in an Orthogonal Frequency Domain Multiplexing (OFDM) based communication system transmitting data information, wherein the method comprises receiving OFDM symbols comprising scattered pilots; obtaining channel estimates on every third bin of the scattered pilots in a frequency domain, wherein the channel estimates are obtained by performing an interpolation in a time domain across the received OFDM symbols; estimating an original channel based on the channel estimates, wherein the original channel in the time domain is estimated by applying a finite impulse response (FIR) low-pass filter in a frequency domain, wherein the FIR low-pass filter is adaptive according to a delay span of an original channel impulse response and is sufficiently wide to cover the delay span of the original channel impulse response; and dividing the received OFDM symbols by the channel estimate to obtain transmitted data information.

20 Claims, 15 Drawing Sheets

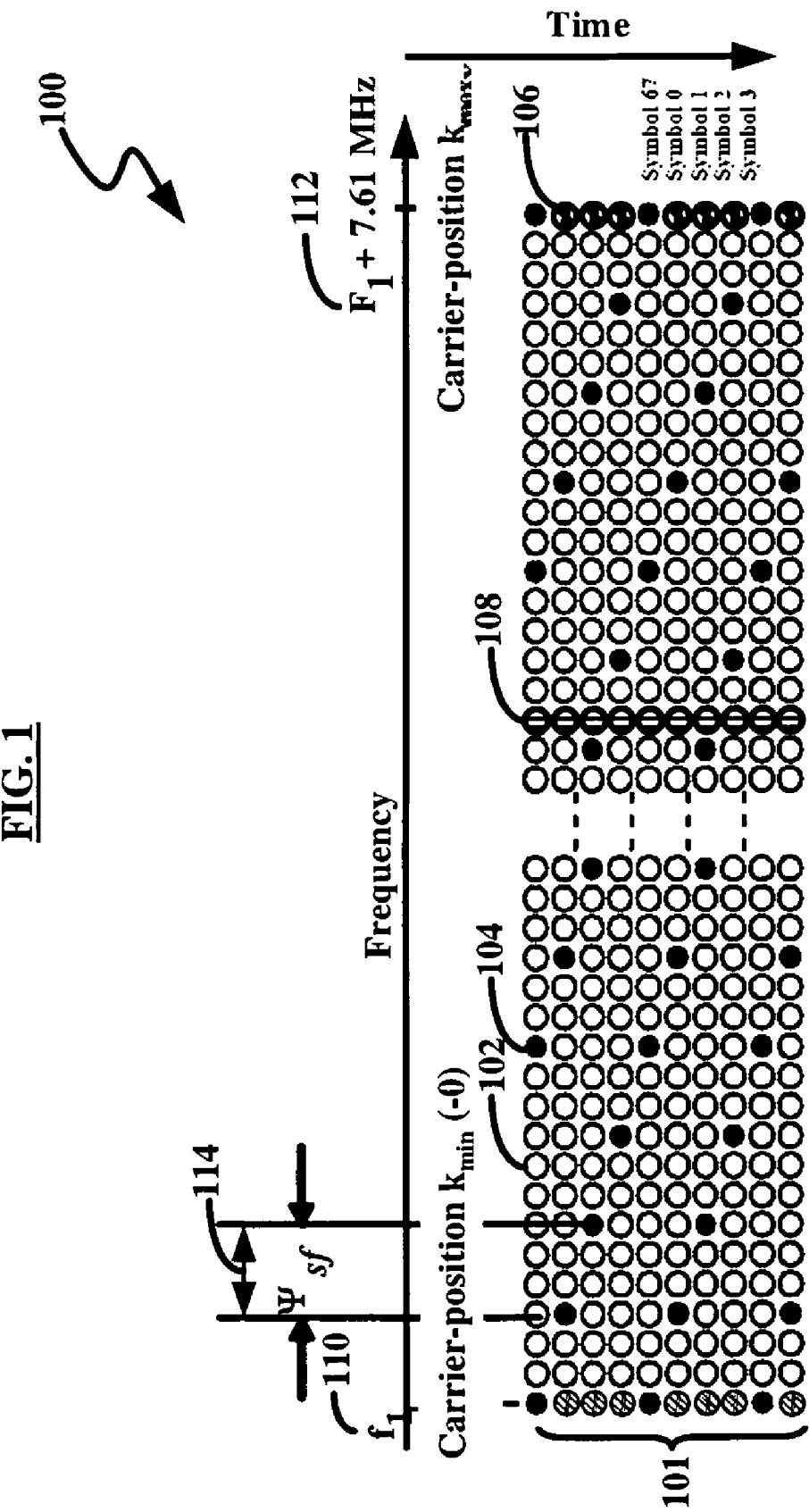

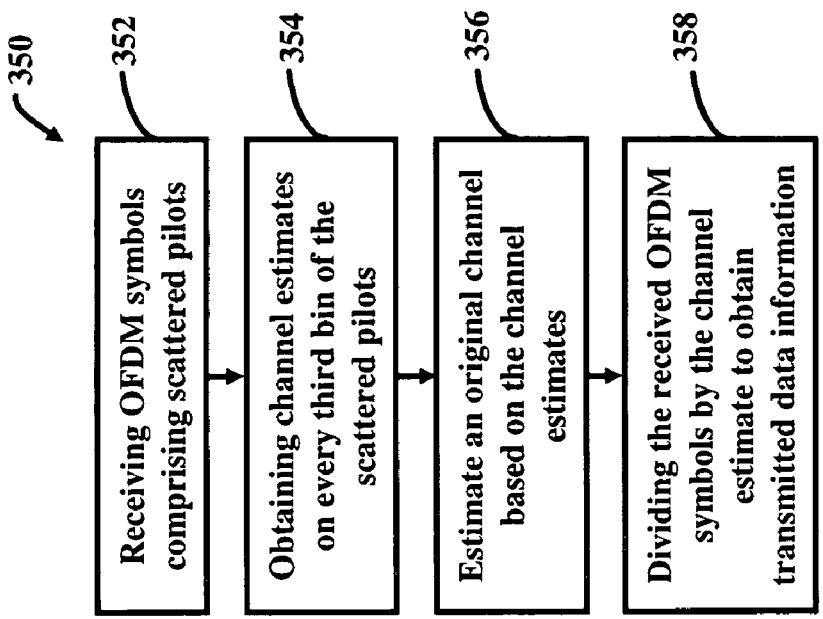
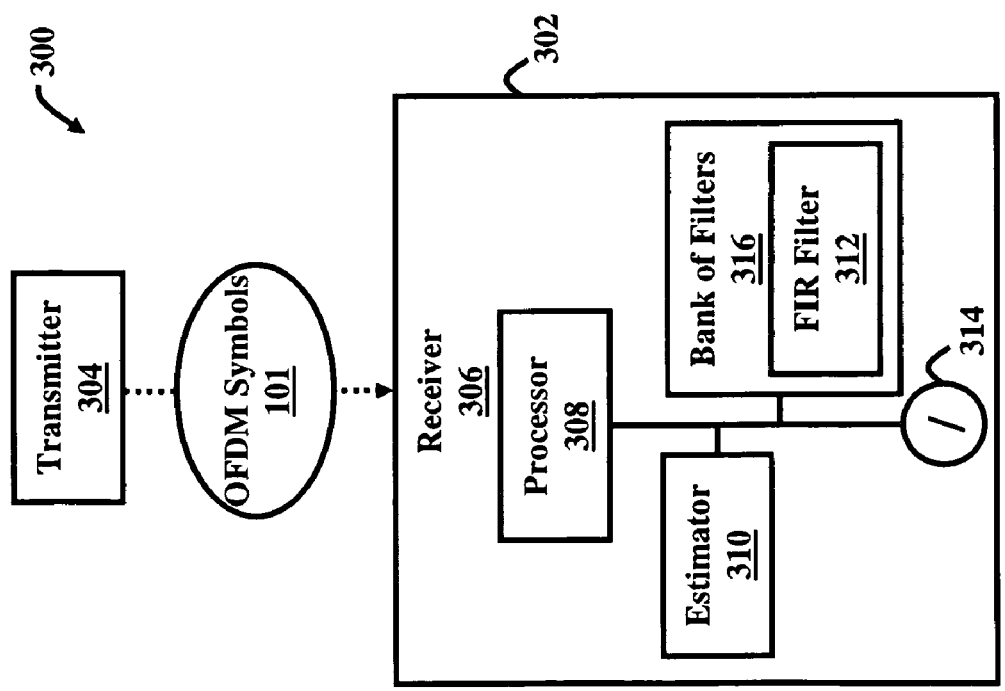

ADAPTIVE FREQUENCY DOMAIN EQUALIZATION IN OFDM BASED COMMUNICATION SYSTEM

BACKGROUND

1. Technical Field

The embodiments herein generally related to wireless communications, and, more particularly, to Orthogonal Frequency Domain Multiplexing (OFDM) based communication systems.

2. Description of the Related Art

Frequency division multiplexing (FDM) is a technology that transmits multiple signals simultaneously over a single transmission path, such as a cable or wireless system. Each signal travels within its own unique frequency range (carrier), which is modulated by the data (text, voice, video, etc.). An OFDM spread spectrum technique distributes the data over a large number of carriers that are spaced apart at precise frequencies. This spacing provides the "orthogonality" in this technique which prevents the demodulators from "seeing" frequencies other than their own. The benefits of OFDM are high spectral efficiency, resiliency to radio frequency (RF) interference, and lower multi-path distortion. This is useful because in a typical terrestrial broadcasting scenario there are multi path-channels (i.e., the transmitted signal arrives at the receiver using various paths of different length).

In a typical OFDM based communication system, pilot tones are inserted in the frequency domain scattered among the data tones. A receiver makes use of these pilot tones to estimate the channel on each frequency bin. The received data on each frequency bin are then divided by the estimated channel on the respective bins to obtain the transmitted information data. This process is usually called frequency domain equalization in OFDM based communication systems.

The channel estimation process based on the pilots tones are usually achieved through interpolation operations. The interpolating function usually takes the form of a finite impulse response (FIR) filter. The FIR filter needs to be chosen such that the original channel frequency response can be reconstructed. As the interpolation base points which are usually chosen to be the estimated channels on the pilot bins are noisy, the FIR filter interpolated channels at all other data bins are also noisy. The noisy channel estimates lead to noisy information data after the frequency domain equalization. This results in degraded carrier-to-noise (C/N) performance in OFDM based communication systems.

SUMMARY

In view of the foregoing, an embodiment herein provides a method for performing adaptive frequency domain equalization in an OFDM based communication system transmitting data information, wherein the method comprises receiving OFDM symbols comprising scattered pilots; obtaining channel estimates on every third bin of the scattered pilots in a frequency domain by performing an interpolation in a time domain across the received OFDM symbols; estimating an original channel in the time domain based on the channel estimates by applying a FIR low-pass filter in a frequency domain; and dividing the received OFDM symbols by the channel estimate to obtain transmitted data information.

Preferably, the delay span is derived using a criterion:

$$|h_i|^2 > \gamma \cdot \sum |h_i|^2, \text{ and } |h_i| > \gamma \cdot \max_i |h_i|,$$

where $h_i$ is a channel impulse response and $\gamma$ is a pre-defined scaling factor. Moreover, the method may further comprises determining an estimate of the delay span of an original channel impulse response using any of a magnitude and power approach, an energy window approach, and a spike detection approach. Additionally, the FIR low-pass filter is preferably selected from a bank of eight FIR low-pass filters.

Preferably, the OFDM based communication system comprises a Digital Video Broadcasting for Terrestrial/Handheld (DVB-T/H) mobile television (TV) broadcasting system. Additionally, the original channel impulse response may be repeated at a time interval of $T_u/3$, wherein $T_u$ is a time duration of one OFDM symbol. Moreover, the maximum noise reduction in the OFDM based communication system preferably equals 1 dB for a Typical Urban Six (TU6) channel.

Another embodiment includes an apparatus for performing adaptive frequency domain equalization in an OFDM based communication system that transmits data information, wherein the apparatus comprises a receiver that receives OFDM symbols comprising scattered pilots; a processor that obtains channel estimates on every third bin of the scattered pilots in a frequency domain, wherein the channel estimates are obtained by performing an interpolation in a time domain across the received OFDM symbols; an estimator that estimates an original channel based on the channel estimates, wherein the original channel in the time domain is estimated by applying a FIR low-pass filter in a frequency domain, wherein the FIR low-pass filter is adaptive according to a delay span of an original channel impulse response and is sufficiently wide to cover the delay span of the original channel impulse response to achieve a maximum noise reduction in the OFDM based communication system; and a divider that divides the received OFDM symbols by the channel estimate to obtain transmitted data information. Preferably, the delay span is derived using a criterion:

$$|h_i|^2 > \gamma \cdot \sum |h_i|^2, \text{ and } |h_i| > \gamma \cdot \max_i |h_i|,$$

where $h_i$ is a channel impulse response and $\gamma$ is a pre-defined scaling factor.

Additionally, the estimator determines an estimate of the delay span of an original channel impulse response using any of a magnitude and power approach, an energy window approach, and a spike detection approach. Preferably, the FIR low-pass filter is selected from a bank of eight FIR low-pass filters. Moreover, the OFDM based communication system comprises a DVB-T/H mobile TV broadcasting system. Preferably, the original channel impulse response is repeated at a time interval of $T_u/3$, wherein $T_u$ is a time duration of one OFDM symbol. Additionally, the maximum noise reduction in the OFDM based communication system may equal 1 dB for a TU6 channel.

Another embodiment includes a system for performing adaptive frequency domain equalization in an OFDM based communication network that transmits data information, wherein the system comprises means for receiving OFDM symbols comprising scattered pilots; means for obtaining channel estimates on every third bin of the scattered pilots in a frequency domain, wherein the channel estimates are obtained by performing an interpolation in a time domain across the received OFDM symbols; means for estimating an original channel based on the channel estimates, wherein the original channel in the time domain is estimated by applying a FIR low-pass filter in a frequency domain, wherein the FIR low-pass filter is adaptive according to a delay span of an original channel impulse response and is sufficiently wide to cover the delay span of the original channel impulse response to achieve a maximum noise reduction in the OFDM based communication system; and means for dividing the received OFDM symbols by the channel estimate to obtain transmitted data information. Preferably, the delay span is derived using a criterion:

$$|h_i|^2 > \gamma \cdot \sum |h_i|^2, \text{ and } |h_i| > \gamma \cdot \max_i |h_i|,$$

where $h_i$ is a channel impulse response and $\gamma$ is a pre-defined scaling factor.

Moreover, the system may further comprise means for determining an estimate of the delay the of an original channel impulse response using any of a magnitude and power approach, an energy window approach, and a spike detection approach. Preferably, the FIR low-pass filter is selected from a bank of eight FIR low-pass filters. Additionally, the original channel impulse response may be repeated at a time interval of $T_u/3$, wherein $T_u$ is a time duration of one OFDM symbol. Preferably, the maximum noise reduction in the OFDM based communication system equals 1 dB for a TU6 channel.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1 is a schematic diagram illustrating a frequency domain pilot structure in a Digital Video Broadcasting for Terrestrial/Handheld (DVB-T/H) mobile television (TV) broadcasting system according to an embodiment herein;

FIG. 3A is a schematic diagram of a system and apparatus according to an embodiment herein;

FIG. 3B is a flow diagram illustrating a method for adaptive frequency domain equalizations in OFDM based communication systems according to an embodiment herein;

DETAILED DESCRIPTION OF PREFERRED EMBODIMENTS

Figure 2A:
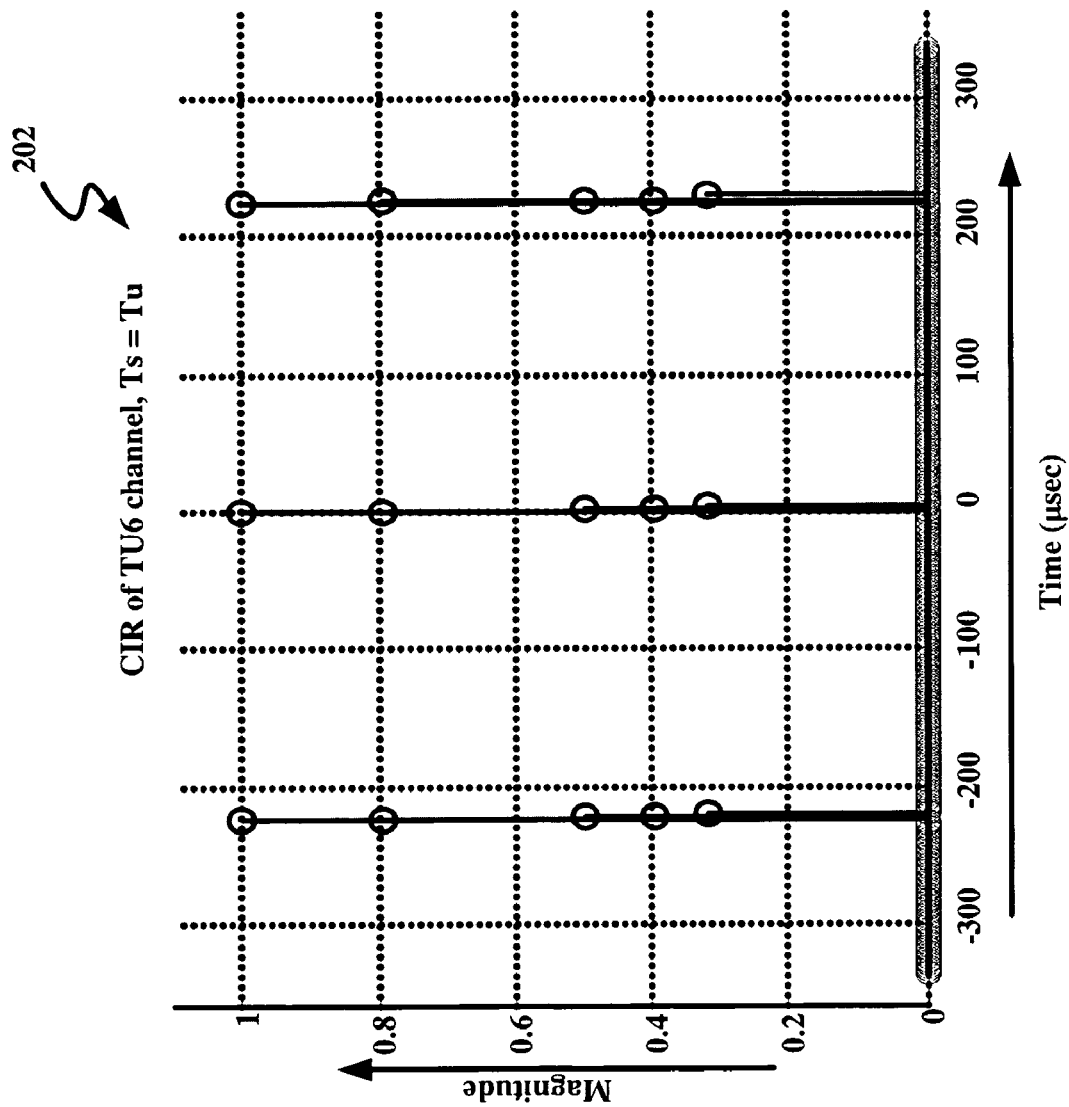
FIGS. 2A through 2I are graphical representations illustrating adaptive frequency domain equalization results for DVB T/H systems according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments provide an adaptive frequency domain equalization technique to improve the C/N performance in OFDM based communication system. Referring now to the drawings, and more particularly to FIGS. 1 through 6, where similar reference characters denote corresponding features consistently throughout the figures, there are shown preferred embodiments.

FIG. 1 graphically illustrates a frequency domain pilot structure 100 in a DVB T/H mobile TV broadcasting system according to an embodiment herein. In FIG. 1 the horizontal direction represents a frequency axis and the vertical direction represents a time axis. The DVB T/H signal structure 100 is divided into a plurality of frames. Each frame contains 68 OFDM symbols 101. Each symbol 101 contains a set of carriers: 6817 in 8K mode, 3409 in 4K mode, and 1705 in 2K mode. Each carrier is independently modulated over the duration of each symbol's transmission. In addition to transmitted data 102, the OFDM symbol 101 contains a plurality of scattered pilot carriers or scattered pilots 104, continual pilot carriers or continual pilots 106, and transmission parameter signaling (TPS) pilots 108. There are 6048 useful carriers in 8K mode, 3524 in 4K mode, and 1512 in 2K mode. In one embodiment, a carrier spacing in 2K mode is 4464 Hz and in 8K mode is 1116 Hz. A carrier position at a frequency ($f_1$) 110 is denoted by $k_{min}$. The carrier position at a frequency $f_1$+7.61 MHz 112 is denoted by $k_{max}$ and is determined in the 2K mode as $k_{max}$–1704 and in the 8K mode as $k_{max}$–6816.

According to one embodiment, in each OFDM symbol 101, the scattered pilots 104 are positioned at every twelve frequency bins. A frequency bin is a band of frequencies of a specific width. Furthermore, a starting point of the scattered pilot 104 is shifted to the right by three frequency bins from one symbol to another subsequent symbol. This shift 114 is represented by $\Psi_{sf}$. Therefore, a location of the scattered pilot 104 in every OFDM symbol 101 is repeated after every four OFDM symbols (3×4=12).

In operation, a received data value on a pilot bin directly reflects a channel estimate on the pilot bin. According to another embodiment, the channel estimate on the pilot bin is used as a base point for an interpolating operation to obtain the channel estimates on other frequency bins which are assumed to be a multiplication of channel information and the transmitted data 102. The assumption of the multiplication operation is because a channel is convolved with a data in a time domain and therefore it is multiplied with the data in a frequency domain.

Figure 2B:
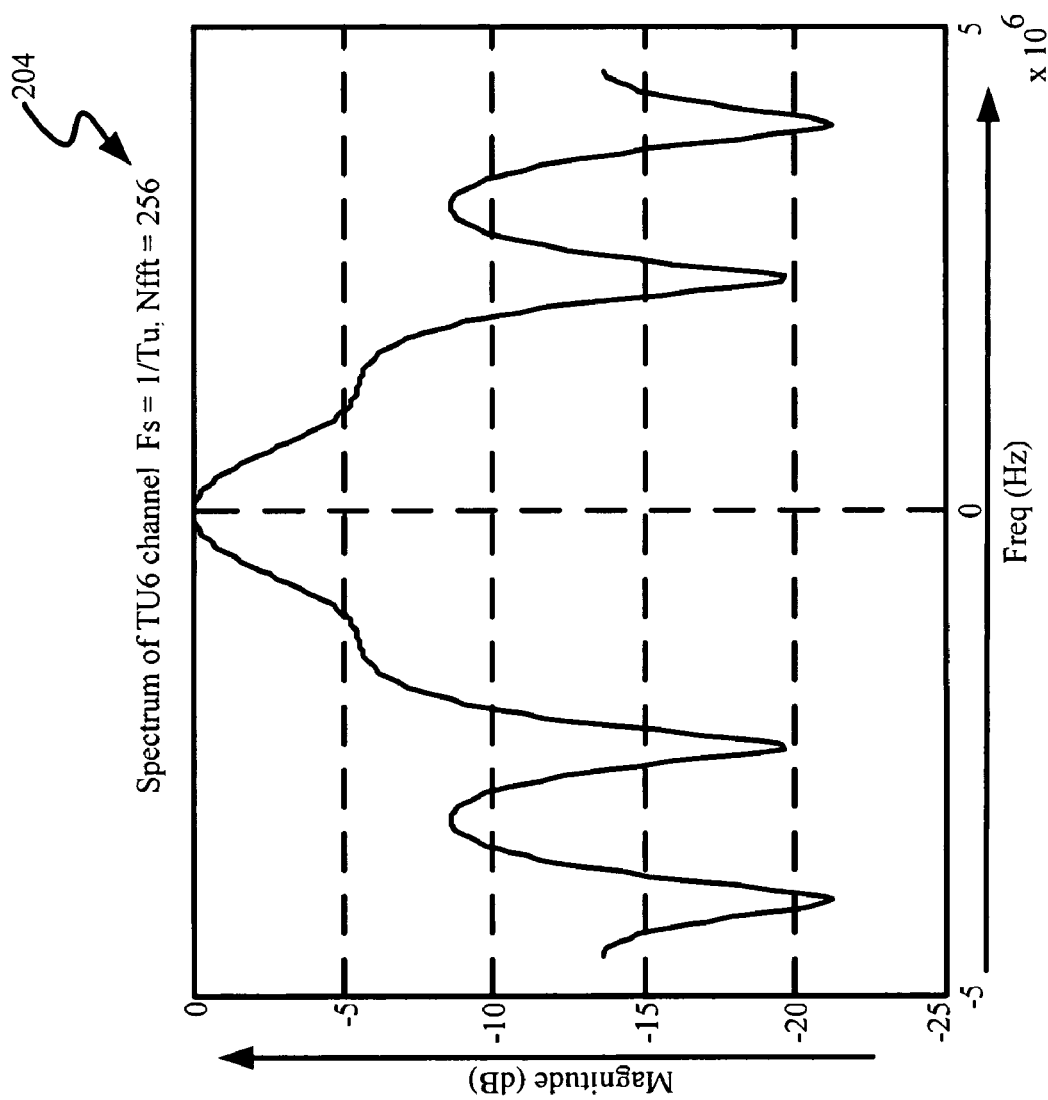
Figure 2C:
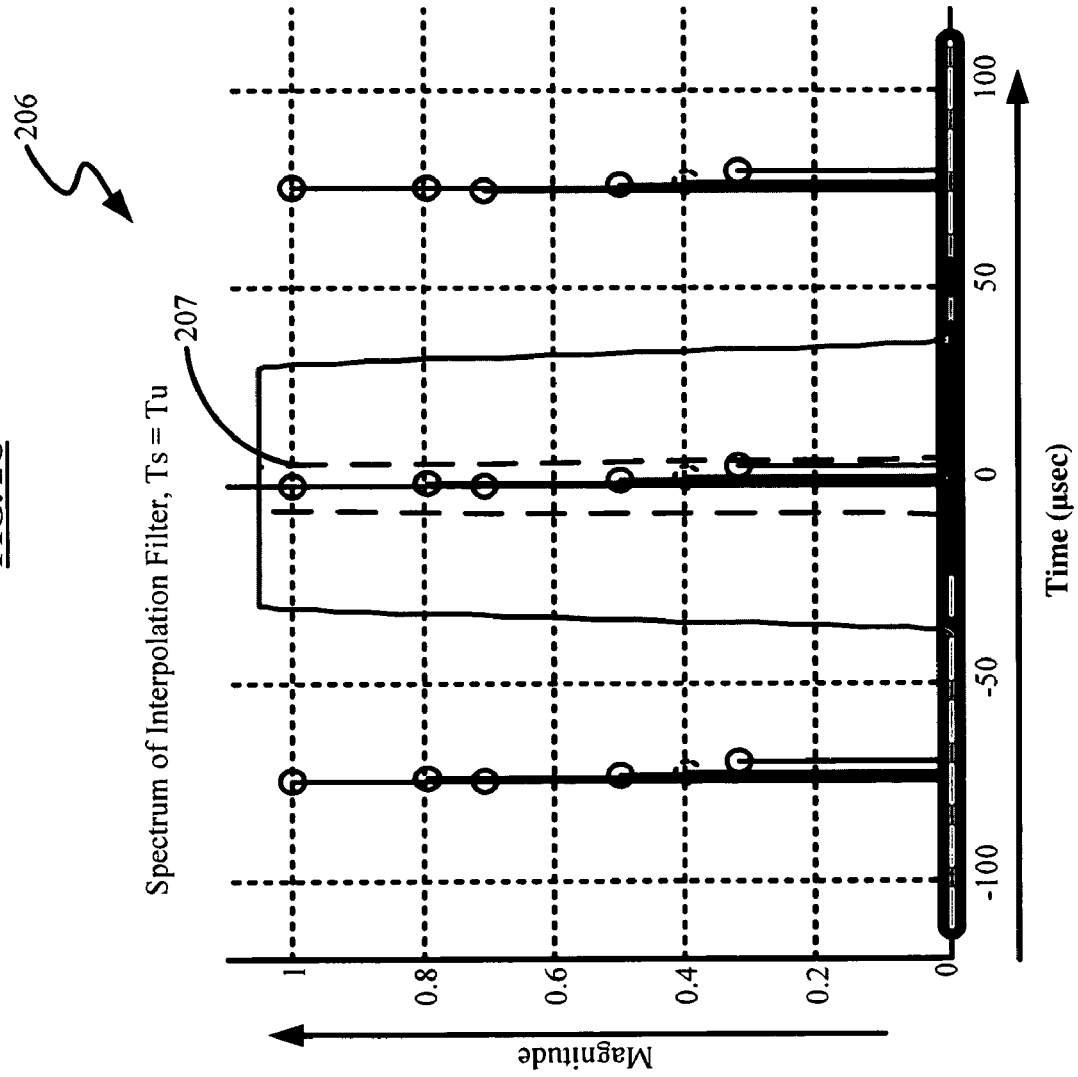
Figure 2D:
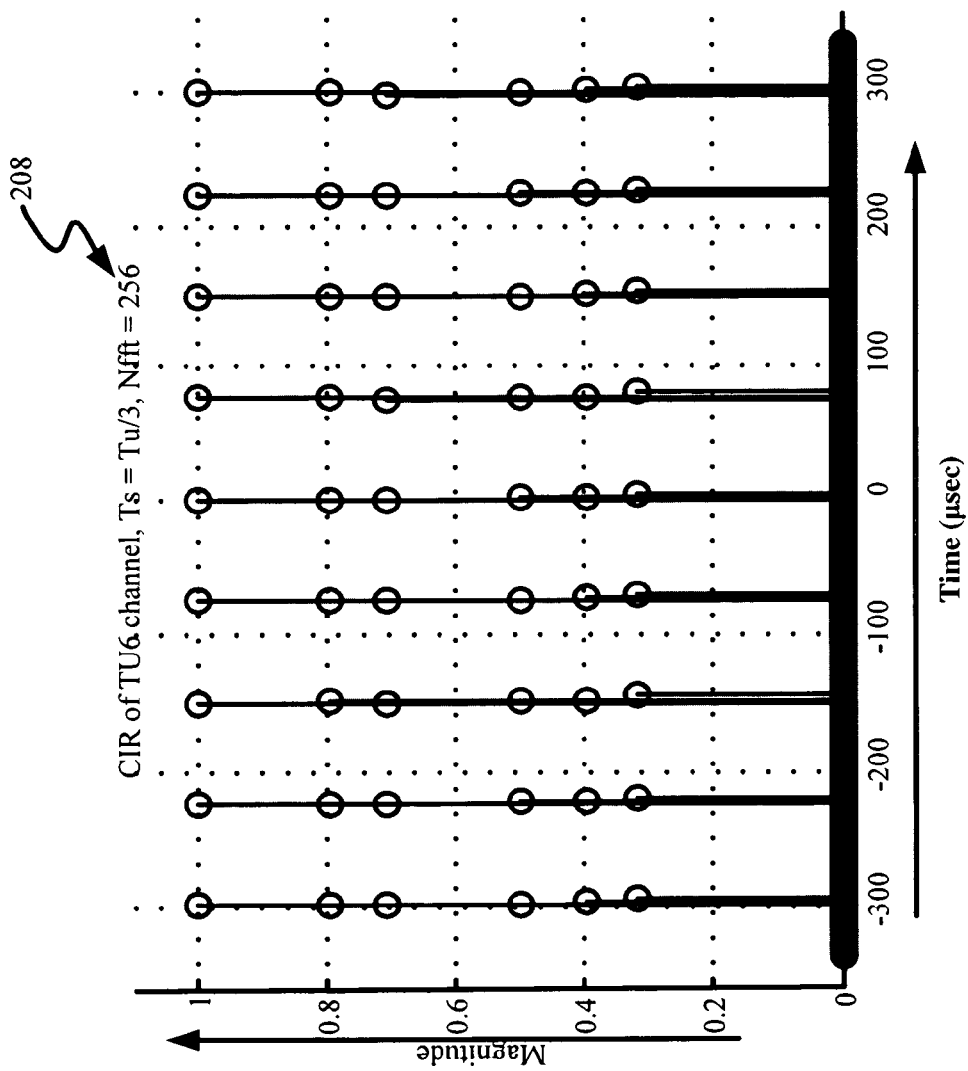

FIGS. 2A through 2I graphically illustrate an adaptive frequency domain equalization scheme for DVB T/H systems according to an embodiment herein. A subplot 202 of FIG. 2A illustrates an impulse response of a Typical Urban Six (TU6) channel which is sampled in the frequency domain by $1/T_u$ where $T_u$ is a duration of one OFDM symbol 101. Generally, the impulse response is repeated at a time interval of $T_u$. A subplot 204 of FIG. 2B illustrates a corresponding frequency response on the TU6 channel as illustrated in the subplot 202 of FIG. 2A. Further details of FIGS. 2A through 2I are described in relation to the method 350 shown in FIG. 3B.

Figure 2E:
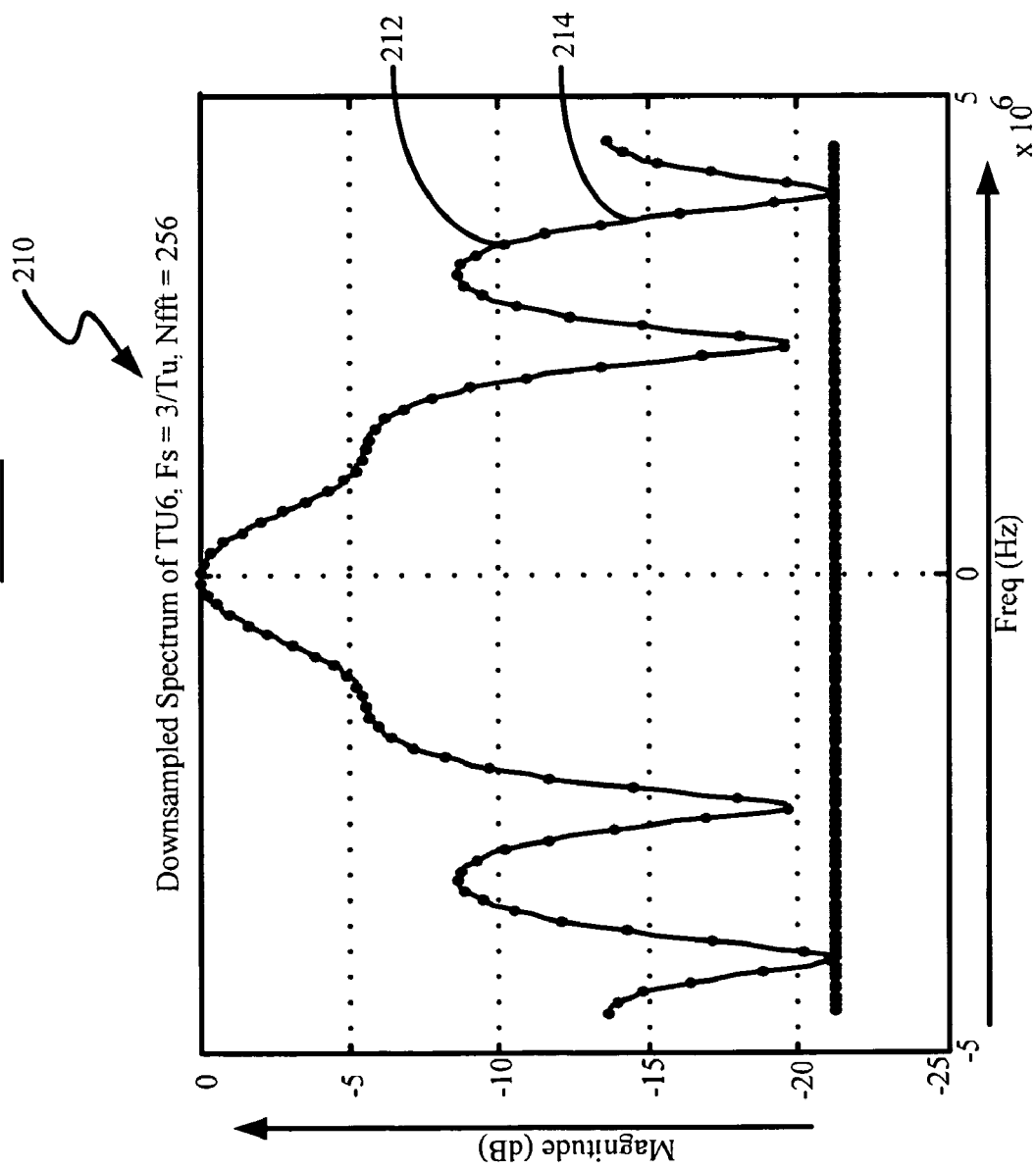
Figure 2F:
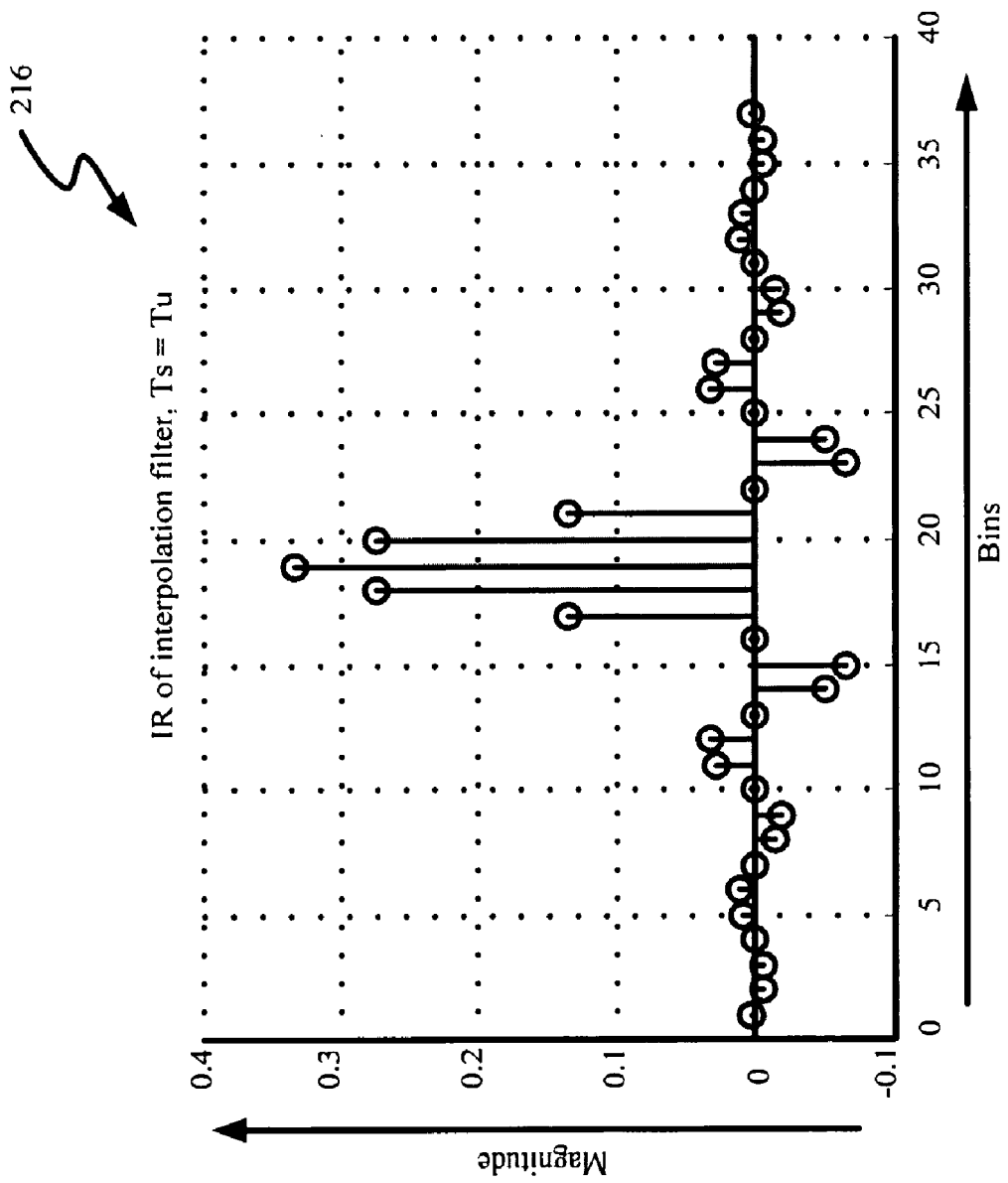
Figure 2G:
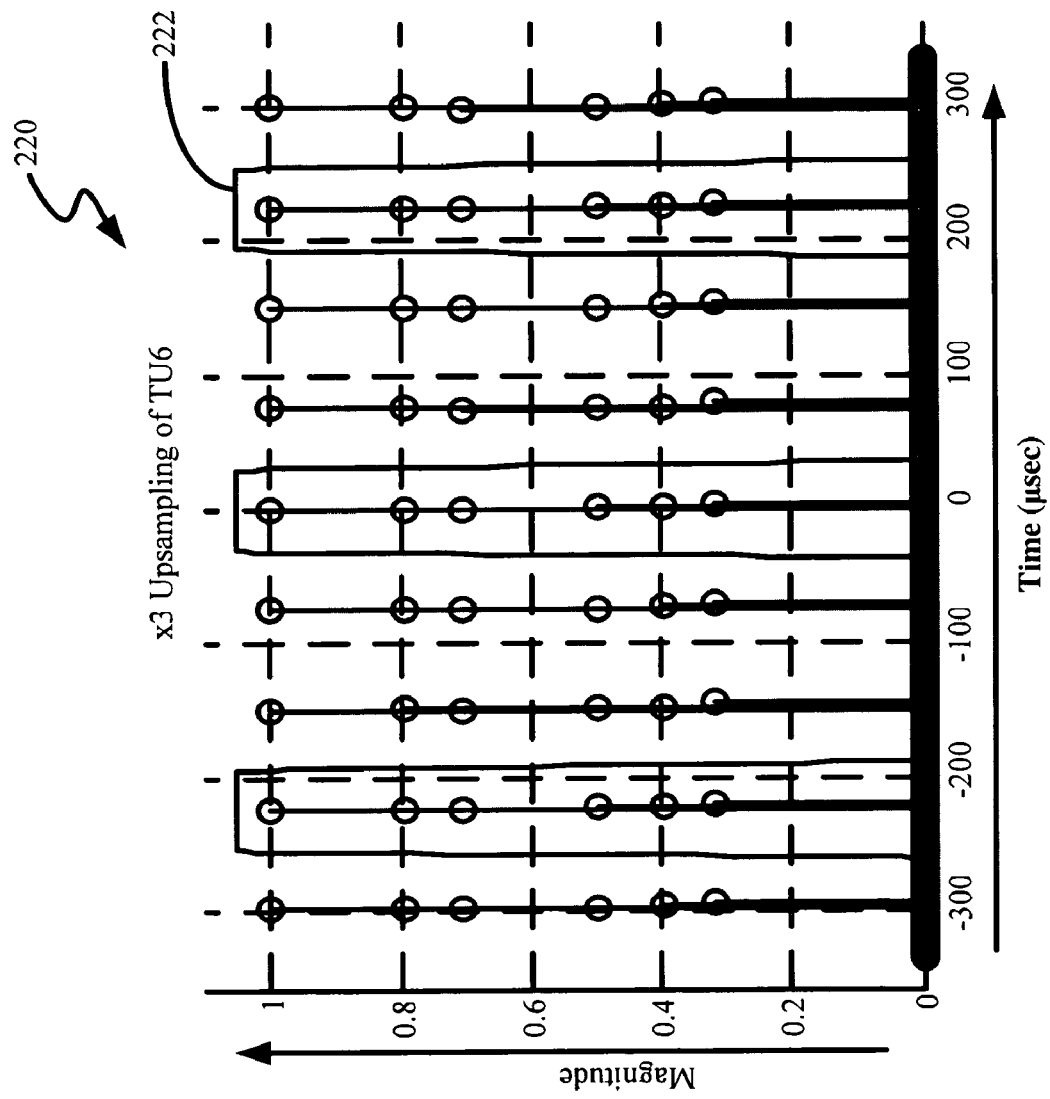
Figure 2H:
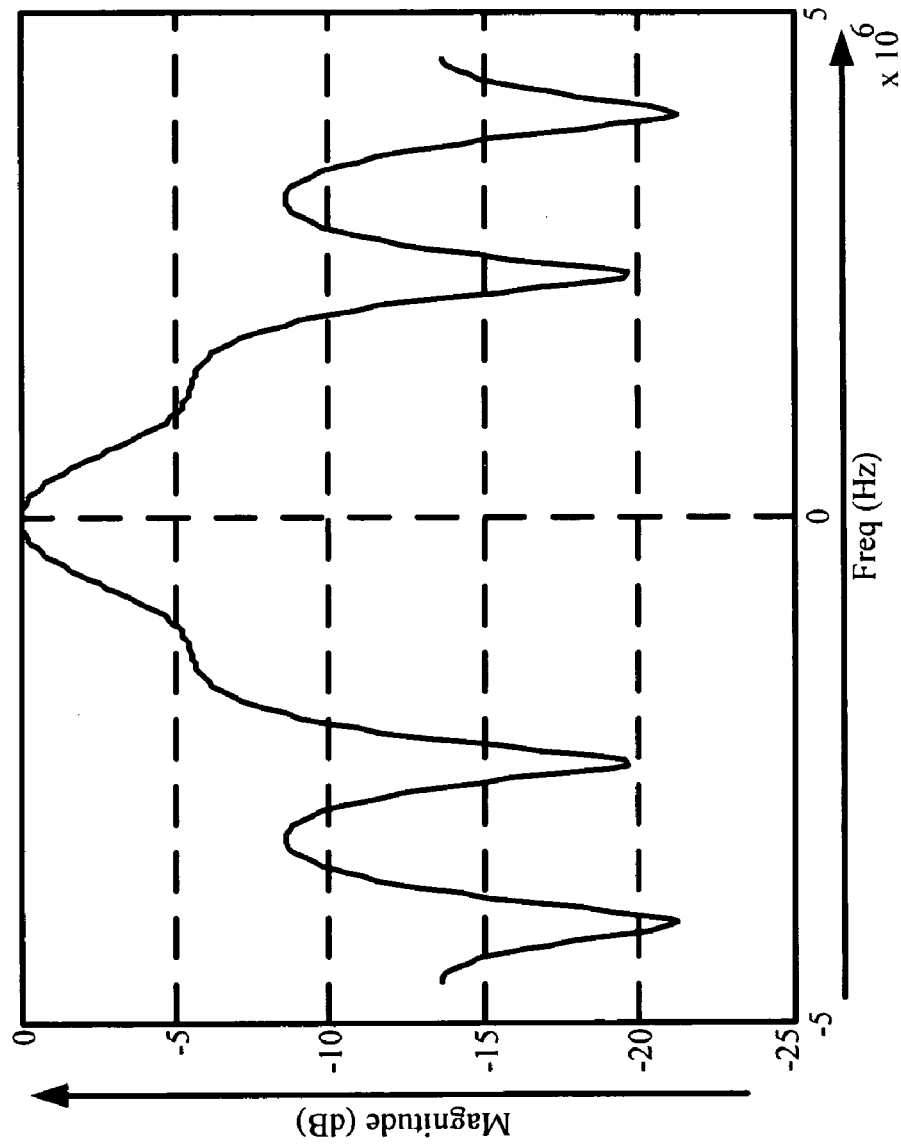
Figure 2I:
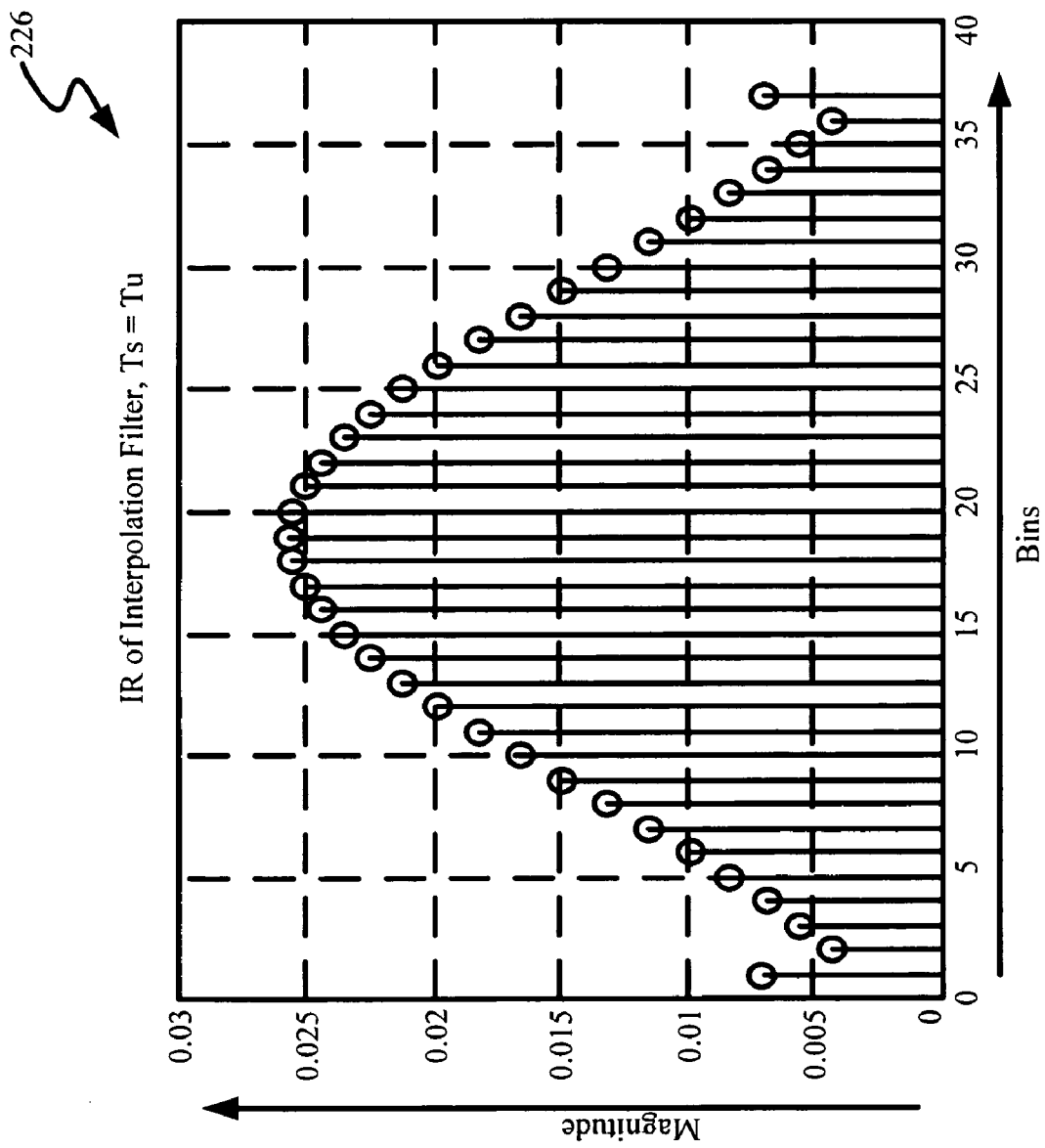

FIG. 3A, with reference to FIGS. 1 through 2I, illustrates an apparatus 302 for performing adaptive frequency domain equalization in an Orthogonal Frequency Domain Multiplexing (OFDM) based communication system 300 that transmits data information 102 (of FIG. 1) from a transmitter 304, wherein the apparatus 302 comprises a receiver 306 that receives OFDM symbols 101 comprising scattered pilots 104 (of FIG. 1). A processor 308 obtains channel estimates on every third bin of the scattered pilots 104 (of FIG. 1) in a frequency domain, wherein the channel estimates are obtained by performing an interpolation in a time domain across the received OFDM symbols 101. An estimator 310 estimates an original channel based on the channel estimates, wherein the original channel in the time domain is estimated by applying a FIR low-pass filter 312 in a frequency domain, wherein the FIR low-pass filter 312 is adaptive according to a delay span of an original channel impulse response and is sufficiently wide to cover the delay span of the original channel impulse response to achieve a maximum noise reduction in the OFDM based communication system 300. A divider 314 divides the received OFDM symbols 101 by the channel estimate to obtain transmitted data information 102 (of FIG. 1). The FIR low-pass filter 312 is selected from a bank of eight FIR low-pass filters 316.

FIG. 3B, with reference to FIGS. 1 through 3A, illustrates a flow diagram of a method 350 for adaptive frequency domain equalizations in an OFDM based communication system that transmits data information 102 according to an embodiment herein. At step 352, OFDM symbols 101 are received by the receiver 306. Next, at step 354, channel estimates on every third bin of scattered pilots 104 in the frequency domain are obtained. Preferably, the channel estimates are obtained by performing an interpolation in the time domain across the received OFDM symbols 101. Moving to step 356, an original channel based on the channel estimates is estimated. Preferably, the original channel is estimated in the time domain by applying a FIR low-pass filter 312 in the frequency domain. Additionally, the FIR low-pass filter 312 is adaptive according to a delay span of the original channel impulse response and is sufficiently wide to cover the delay span of the original channel impulse response to achieve maximum noise reduction. Next, at step 358, the received OFDM symbols 101 are divided by the channel estimates to obtain the transmitted data information 102 (of FIG. 1).

The channel estimates on the scattered pilots 100 (of FIG. 1) which are every twelve frequency bins apart are known. The channel estimates on the scattered pilots 104 (of FIG. 1) which are every three frequency bins apart are obtained by performing an interpolation in the time domain across a plurality of OFDM symbols 101.

Referring back to FIG. 1, the channel estimates are repeated every four symbols 101. Therefore, the channel estimates are known for every four symbols 101. In one embodiment, the channel estimates in between every four symbols 101 are obtained through interpolation based on the channel estimates on the scattered pilots 104. This is achieved by applying a FIR filter 312 in the time domain. In another embodiment, a channel impulse response estimate in the time domain obtained by original as well as interpolated scattered pilots which are three frequency bins apart in the frequency domain and is illustrated by a subplot 208 of FIG. 2D. The impulse response is repeated at a time interval of $T_u/3$. The corresponding frequency response is illustrated by a plurality of dots 212 in a subplot 210 of FIG. 2E. Furthermore, the plurality of dots 212 of FIG. 2E represents a sampled subset of an original spectrum illustrated by a pattern 214 in the subplot 210 of FIG. 2E.

At step 356, an original channel is estimated based on the channel estimates obtained at step 354. In one embodiment, the original channel is estimated based on the channel estimates obtained from the scattered pilots 104 (of FIG. 1) which are three frequency bins apart in the frequency domain. In the time domain, it is equivalent to reconstruct the subplot 202 (of FIG. 2A) from the subplot 208 (of FIG. 2D). Similarly, in the frequency domain, it is equivalent to reconstruct the subplot 204 (of FIG. 2B) from the subplot 210 (of FIG. 2E). Further, to achieve this goal, the FIR filter 312 is chosen to interpolate the plurality of dots 212 in the subplot 210 of FIG. 2E to construct the subplot 204 (of FIG. 2B). Alternatively, the interpolation of the plurality of dots 212 in the subplot 210 of FIG. 2E is used to obtain the channel estimated on the frequency bins between the two scattered pilots 104 (of FIG. 1) which are three frequency bins apart. In the time domain, this interpolation procedure is equivalent to applying a FIR low-pass filter 312 in the frequency domain which is illustrated by a pattern 222 in a subplot 220 of FIG. 2G to filter out extra components and to reconstruct the original channel impulse response as shown in the subplot 202 (of FIG. 2A).

According to another embodiment, the FIR low-pass filter 312 illustrated by the pattern 222 in the subplot 220 (of FIG. 2G) has the impulse response in the time domain as illustrated in a subplot 216 of FIG. 2F. Further, a subplot 224 of FIG. 2H illustrates a frequency response of a reconstructed channel which is same as an original frequency response as illustrated by the subplot 204 (of FIG. 2B).

According to another embodiment, an adaptation procedure is applied. In the subplot 220 (of FIG. 2G), the bandwidth of the FIR low-pass filter 312 does not have to be fixed. As long as the FIR low-pass filter's bandwidth is sufficiently wide to cover a delay span of the original channel impulse response, the original channel impulse response can be reconstructed through the interpolation filtering process as described previously. Generally, as the channel estimates are noisy, the noise is equally spanned across the band. Therefore, the wider the FIR low-pass filter 312, the more residual noise is allowed after the interpolation. As a result, the FIR low-pass filter's bandwidth is adaptive according to the delay span of the channel impulse response and/or is just wide enough to cover the delay span of the original channel impulse response to achieve the maximum noise reduction.

For a DVB-T/H system, it can be shown that this adaptive procedure can improve the C/N by about 1 decibel (dB) for the TU6 channel. The delay span is estimated in advance to choose the FIR low-pass filter 312 with a narrowest possible bandwidth. The delay span estimation of the channel impulse response and the configuration of the FIR low-pass filter 312 is described below with reference to FIGS. 4 through FIG. 5B. In a subplot 206 of FIG. 2C, a FIR low-pass filter frequency response with a narrower bandwidth is illustrated by a pattern 207 to achieve a maximum noise reduction. The corresponding impulse response in the time domain is shown in a subplot 226 of FIG. 2I. Next, at step 358, transmitted information data is determined by dividing the received OFDM symbols 101 by the channel estimates obtained at step 354 as described previously.

Figure 4:
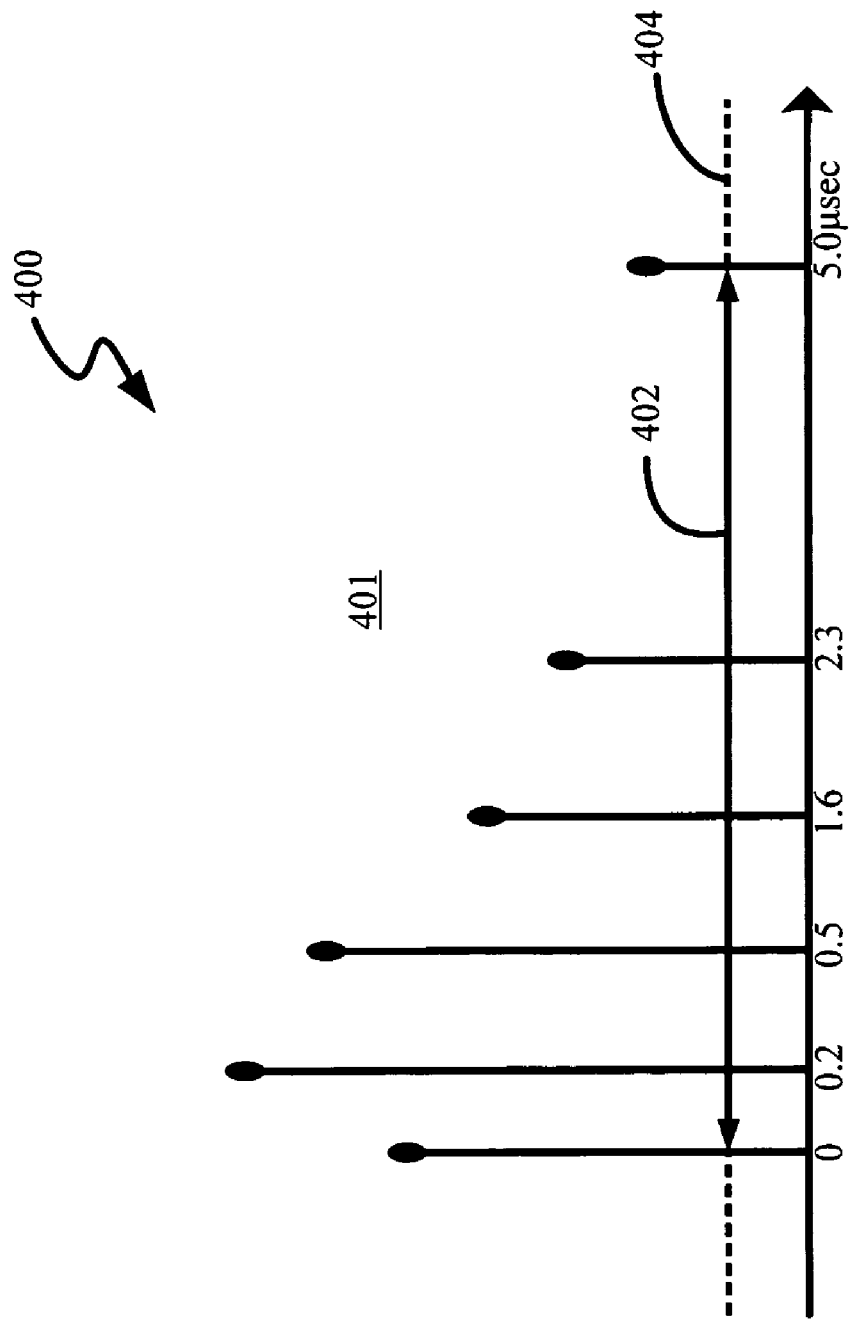
FIG. 4 illustrates a channel impulse response of a TU6 channel according to an embodiment herein.

Generally, various methods are applied for the channel delay span estimation. Such methods may be based on the magnitude and power and/or energy window and/or spike detection, etc. FIG. 4 illustrates a channel impulse response 400 of a TU6 channel 401 according to an embodiment herein. The channel impulse response 400 of the TU6 channel 401 is described by a variable $h_i$ in the following text. The estimated channel is usually noisy and to determine a delay span 402 (or the delay spread 402), the following criteria is used:

$$|h_i|^2 > \gamma \cdot \sum |h_i|^2 \quad (1)$$

$$|h_i| > \gamma \cdot \max_i |h_i| \quad (2)$$

where $\gamma$ is a pre-defined scaling factor.

In one embodiment, a threshold 404 is equal to a quantity on right hand side of the equations (1) and (2) described above. The distance between a leftmost $h_i$ and a rightmost $h_i$ satisfying equations (1) or (2) is equal to the delay span 402 of the estimated channel impulse response of the TU6 channel 401.

Figure 5A:
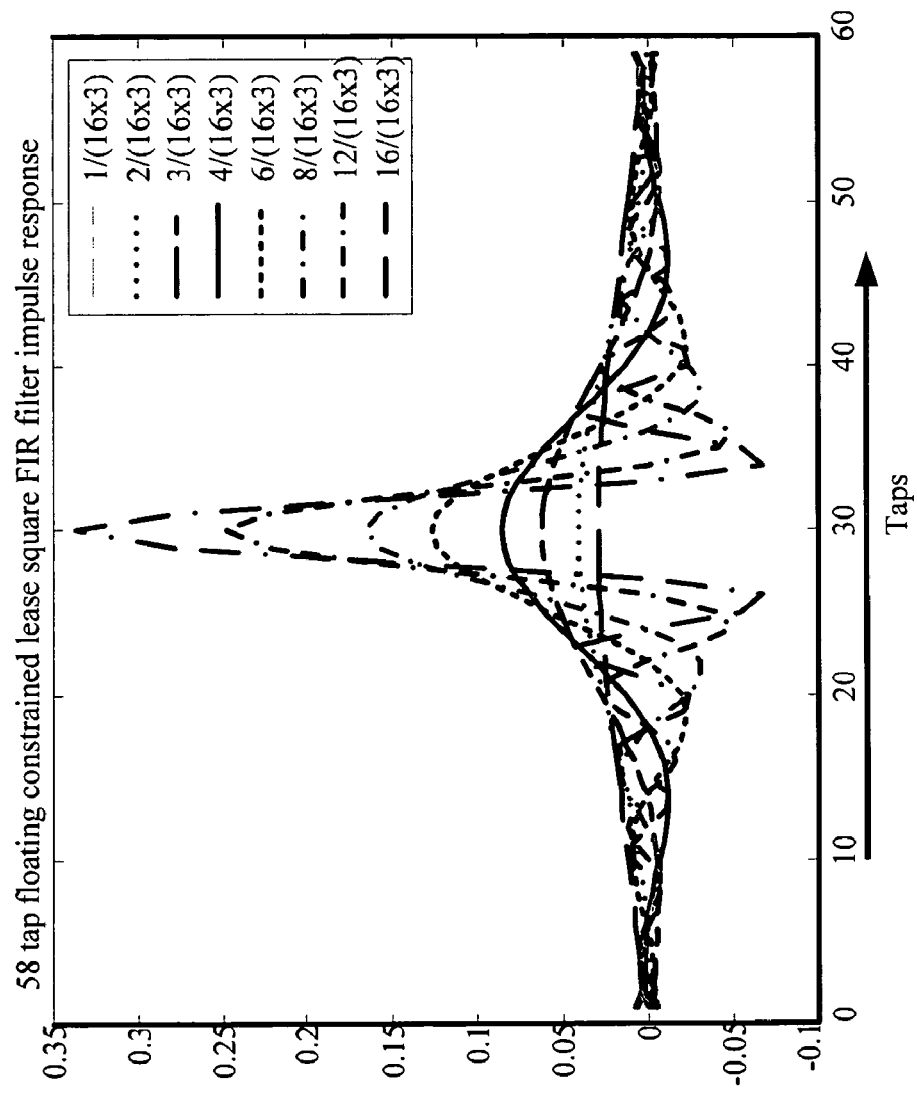
FIGS. 5A and 5B illustrate an impulse response and a corresponding frequency response respectively of a bank of eight FIR low-pass filters with different bandwidths according to an embodiment herein.
Figure 5B:
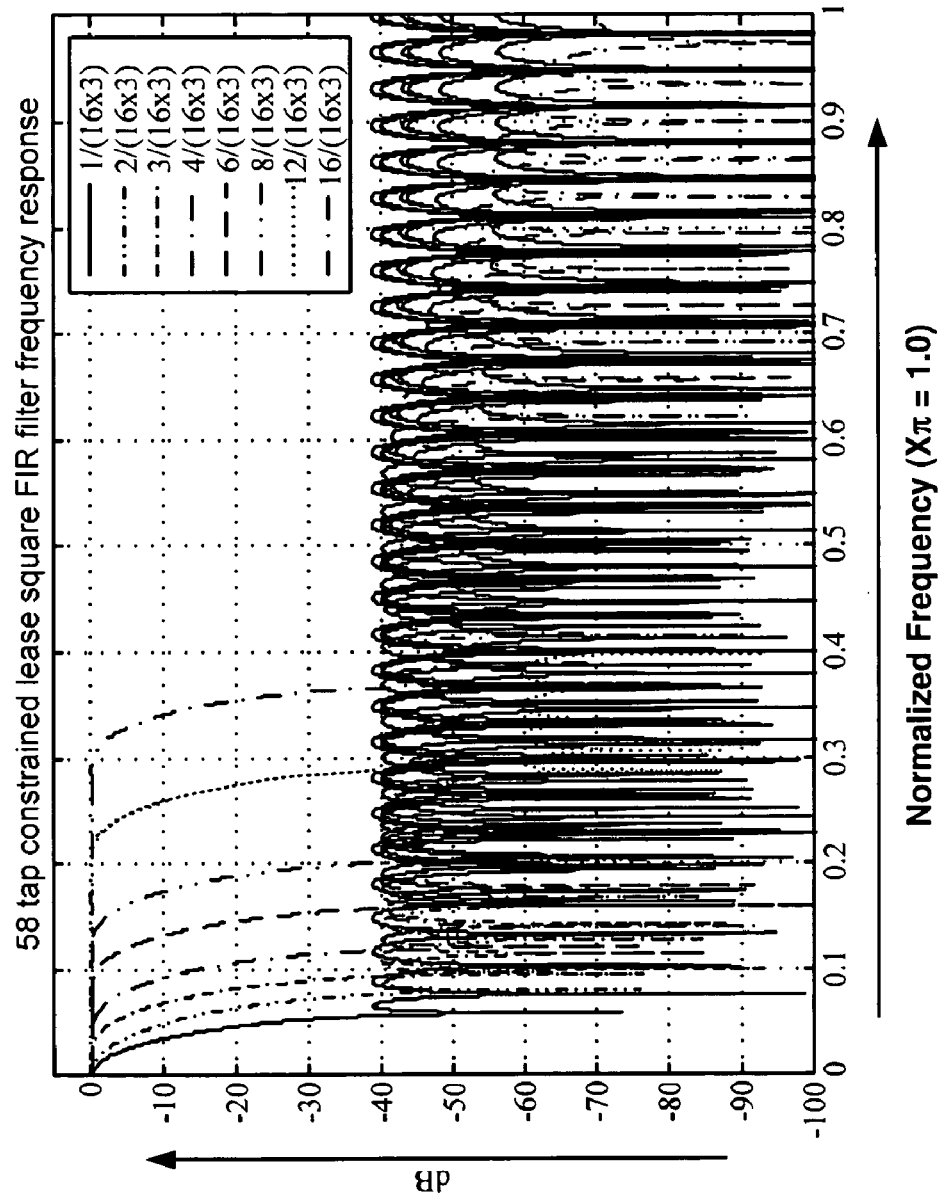

FIGS. 5A and 5B illustrate an impulse response 502 and a corresponding frequency response 506 respectively of a bank of eight FIR low-pass filters 316 (of FIG. 3A) with different bandwidths according to an embodiment herein. During the adaptive frequency equalization procedure as described previously, the FIR low-pass filter 312 (of FIG. 3A) is chosen from the eight filter banks 316 (of FIG. 3A) according to the delay span of the channel impulse response estimated using the method 350 (of FIG. 3B) such that the FIR low-pass filter's bandwidth is just wide enough to cover the delay span estimate to reconstruct the original channel impulse response.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
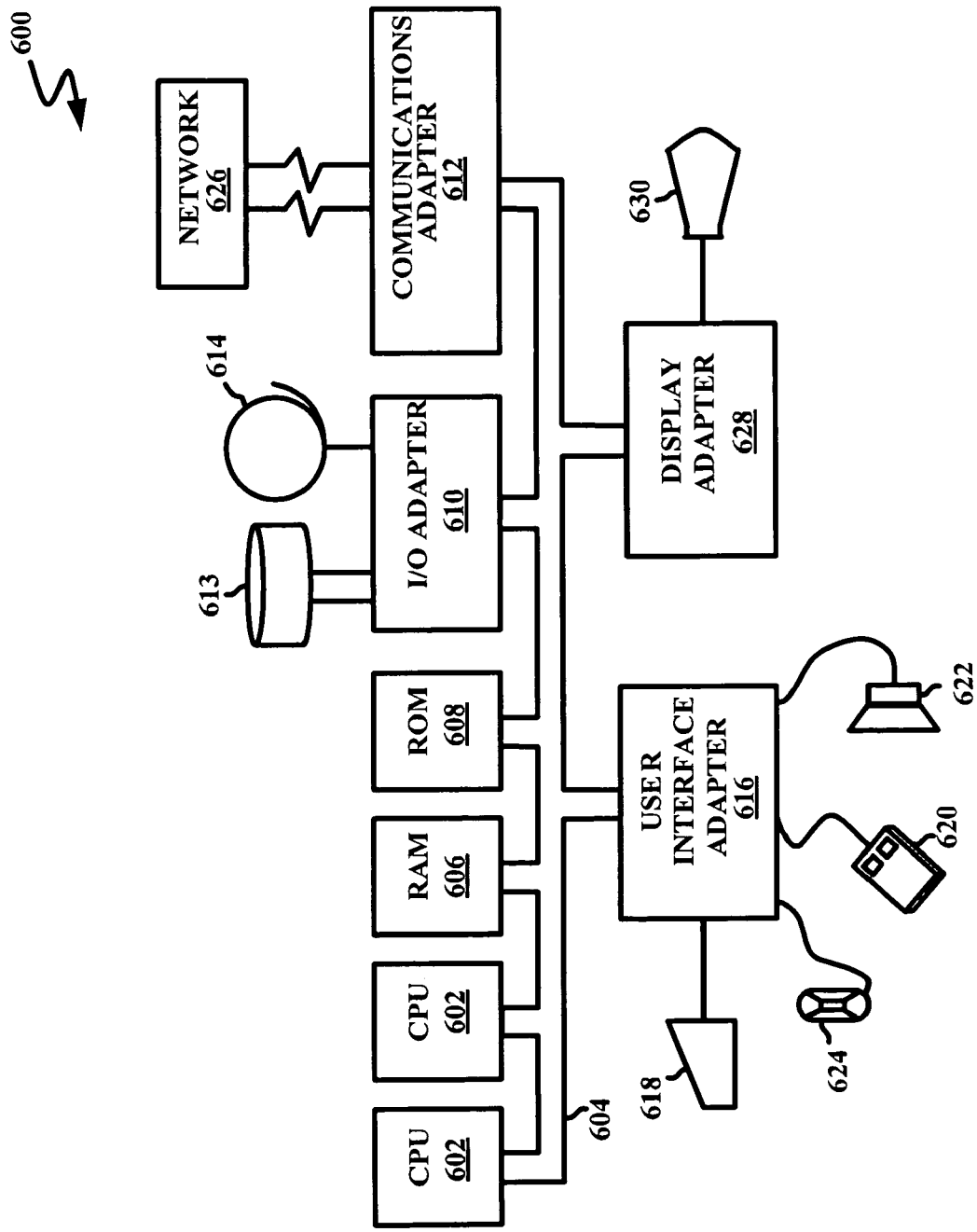
FIG. 6 illustrates a schematic diagram of a computer architecture used in accordance with the embodiments herein.

A representative hardware environment for practicing the embodiments herein is depicted in FIG. 6. This schematic drawing illustrates a hardware configuration 600 of an information handling/computer system in accordance with the embodiments herein. The system comprises at least one processor or central processing unit (CPU) 602. The CPUs 602 are interconnected via system bus 604 to various devices such as a random access memory (RAM) 606, read-only memory (ROM) 608, and an input/output (I/O) adapter 610. The I/O adapter 610 can connect to peripheral devices, such as disk units 613 and tape drives 614, or other program storage devices that are readable by the system. The system can read the inventive instructions on the program storage devices and follow these instructions to execute the methodology of the embodiments herein. The system further includes a user interface adapter 616 that connects a keyboard 618, mouse 620, speaker 622, microphone 624, and/or other user interface devices such as a touch screen device (not shown) to the bus 604 to gather user input. Additionally, a communication adapter 612 connects the bus 604 to a data processing network 626, and a display adapter 628 connects the bus 604 to a display device 630 which may be embodied as an output device such as a monitor, printer, or transmitter, for example.

The embodiments herein provide a method and apparatus for adaptive frequency domain equalizations in OFDM based communication systems, which is effective to improve the C/N performance in OFDM based communications by approximately 1 dB under the mobile channel modeled by a TU6 channel. In addition, the embodiments herein employ a magnitude and power threshold based approach as discussed above with reference to FIG. 4 to estimate the delay span of a channel; this helps in selecting a FIR low-pass filter (shown in FIGS. 5A and 5B) with the narrowest possible bandwidth.

The embodiments herein are described for each OFDM symbol 101 in which the scattered pilots 104 are positioned every twelve frequency bins apart and the starting point of the scattered pilots 104 is shifted to the right by three bins from symbol to symbol. Those ordinary skilled in the art will appreciate that OFDM symbols 101 in which the scattered pilots 104 are positioned at different lengths may be employed. Moreover, the starting point of the scattered pilots may shift in a different possible manner than as described above.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for performing adaptive frequency domain equalization in an Orthogonal Frequency Domain Multiplexing (OFDM) based communication system that transmits data information, said method comprising:
    receiving OFDM symbols comprising scattered pilots;
    obtaining channel estimates on every third bin of said scattered pilots in a frequency domain, wherein said channel estimates are obtained by performing an interpolation in a time domain across the received OFDM symbols;
    estimating an original channel based on said channel estimates, wherein said original channel in said time domain is estimated by applying a finite impulse response (FIR) low-pass filter in a frequency domain, wherein said FIR low-pass filter is adaptive according to a delay span of an original channel impulse response and is sufficiently wide to cover said delay span of said original channel impulse response to achieve a maximum noise reduction in said OFDM based communication system, wherein said maximum noise reduction in said OFDM based communication system approximately equals 1 dB for a Typical Urban Six (TU6) channel; and
    dividing said received OFDM symbols by said channel estimate to obtain transmitted data information.

2. The method of claim 1, wherein said delay span is derived using a criterion:

$$|h_i|^2 > \gamma \cdot \sum |h_i|^2, \text{ and } |h_i| > \gamma \cdot \max_i |h_i|,$$

where $h_i$ is a channel impulse response and $\gamma$ is a pre-defined scaling factor.

3. The method of claim 1, further comprising determining an estimate of said delay span of an original channel impulse response using any of a magnitude and power approach, an energy window approach, and a spike detection approach.

4. The method of claim 1, wherein said FIR low-pass filter is selected from a bank of eight FIR low-pass filters.

5. The method of claim 1, wherein said OFDM based communication system comprises a Digital Video Broadcasting for Terrestrial/Handheld (DVB-T/H) mobile television (TV) broadcasting system.

6. The method of claim 1, wherein said original channel impulse response is repeated at a time interval of $T_u/3$, wherein $T_u$ is a time duration of one OFDM symbol.

7. The method of claim 1, wherein each OFDM symbol comprises a set of carriers.

8. An apparatus for performing adaptive frequency domain equalization in an Orthogonal Frequency Domain Multiplexing (OFDM) based communication system that transmits data information, said apparatus comprising:
    a receiver that receives OFDM symbols comprising scattered pilots;
    a processor that obtains channel estimates on every third bin of said scattered pilots in a frequency domain, wherein said channel estimates are obtained by performing an interpolation in a time domain across the received OFDM symbols;
    an estimator that estimates an original channel based on said channel estimates, wherein said original channel in said time domain is estimated by applying a finite impulse response (FIR) low-pass filter in a frequency domain, wherein said FIR low-pass filter is adaptive according to a delay span of an original channel impulse response and is sufficiently wide to cover said delay span of said original channel impulse response to achieve a maximum noise reduction in said OFDM based communication system; and
    a divider that divides said received OFDM symbols by said channel estimate to obtain transmitted data information, wherein said delay span is derived using a criterion $$|h_i|^2 > \gamma \cdot \sum |h_i|^2, \text{ and } |h_i| > \gamma \cdot \max_i |h_i|,$$

where $h_i$ is a channel impulse response and $\gamma$ is a pre-defined scaling factor.

9. The apparatus of claim 8, wherein each OFDM symbol comprises a set of carriers.

10. The apparatus of claim 8, wherein said estimator determines an estimate of said delay span of an original channel impulse response using any of a magnitude and power approach, an energy window approach, and a spike detection approach.

11. The apparatus of claim 8, wherein said FIR low-pass filter is selected from a bank of eight FIR low-pass filters.

12. The apparatus of claim 8, wherein said OFDM based communication system comprises a Digital Video Broadcasting for Terrestrial/Handheld (DVB-T/H) mobile television (TV) broadcasting system.

13. The apparatus of claim 8, wherein said original channel impulse response is repeated at a time interval of $T_u/3$, wherein $T_u$ is a time duration of one OFDM symbol.

14. The apparatus of claim 8, wherein said maximum noise reduction in said OFDM based communication system equals 1 dB for a Typical Urban Six (TU6) channel.

15. A system for performing adaptive frequency domain equalization in an Orthogonal Frequency Domain Multiplexing (OFDM) based communication network that transmits data information, said system comprising:
- means for receiving OFDM symbols comprising scattered pilots;
- means for obtaining channel estimates on every third bin of said scattered pilots in a frequency domain, wherein said channel estimates are obtained by performing an interpolation in a time domain across the received OFDM symbols;
- means for estimating an original channel based on said channel estimates, wherein said original channel in said time domain is estimated by applying a finite impulse response (FIR) low-pass filter in a frequency domain, wherein said FIR low-pass filter is adaptive according to a delay span of an original channel impulse response and is sufficiently wide to cover said delay span of said original channel impulse response to achieve a maximum noise reduction in said OFDM based communication system, wherein said maximum noise reduction in said OFDM based communication system approximately equals 1 dB for a Typical Urban Six (TU6) channel; and
- means for dividing said received OFDM symbols by said channel estimate to obtain transmitted data information.

16. The system of claim 15, wherein said delay span is derived using a criterion:

$$|h_i|^2 > \gamma \cdot \sum |h_i|^2, \text{ and } |h_i| > \gamma \cdot \max_i |h_i|,$$

where $h_i$ is a channel impulse response and $\gamma$ is a pre-defined scaling factor.

17. The system of claim 15, further comprising means for determining an estimate of said delay span of an original channel impulse response using any of a magnitude and power approach, an energy window approach, and a spike detection approach.

18. The system of claim 15, wherein said FIR low-pass filter is selected from a bank of eight FIR low-pass filters.

19. The system of claim 15, wherein said original channel impulse response is repeated at a time interval of $T_u/3$, wherein $T_u$ is a time duration of one OFDM symbol.

20. The system of claim 15, wherein each OFDM symbol comprises a set of carriers.

* * * * *